UNITED STATES PATENT OFFICE.

OTTO ERNST AND HEINRICH EICHWEDE, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

PROCESS OF PRODUCING DISCHARGEABLE DYEINGS ON COTTON.

1,012,619.  Specification of Letters Patent.  Patented Dec. 26, 1911.

No Drawing.   Application filed January 26, 1911.  Serial No. 604,884.

*To all whom it may concern:*

Be it known that we, OTTO ERNST, Ph. D., chemist, and HEINRICH EICHWEDE, Ph. D., chemist, citizens of the Empire of Germany, residing at Höchst-on-the-Main, Germany, have invented certain new and useful Improvements in Processes of Producing Dischargeable Dyeings on Cotton, of which the following is a specification.

It is known that by impregnating the fiber with chrysoidin hydrochlorid and then developing and fixing the chrysoidin by a subsequent treatment with nitrodiazobenzene, there can be obtained dyeings on cotton which are capable of being discharged. Now according to our present invention such dyeings can be produced very advantageously by using monoazo-dyestuffs obtainable by combining a diazotized aminonaphtholsulfonic acid with meta-phenylenediamin or a derivative thereof. The azo-dyestuffs most suitable for this new process are those obtained from aminonaphtholsulfonic acids which, after being diazotized, are still capable of being combined with one molecular proportion of nitrodiazobenzene. These "developing" dyestuffs are therefore distinguished from the chrysoidins hitherto used, not only by the fact that they are sulfonic acids and that they are applied to the fiber in the form of the salts of these acids, but also by the fact that they can be combined with two molecular proportions of nitrodiazobenzene. This is the essential difference and owing to this property the dyestuffs are transformed on the fiber into products of greatly-increased molecular weight, especially as they receive two molecules of the nitrodiazobenzene, thus rendering the dyeings very intense and very fast to washing, a result which could not be expected owing to the presence of the sulfonic acid groups. The dyestuffs containing sulfonic acid groups which have been hitherto developed in a similar manner are direct dis- and poly-azo-dyestuffs and are already, as such, of rather good fastness to washing. In the present process the good solubility of the dyestuffs in water is of great importance; it facilitates their application to the fiber and renders the use of boiling baths unnecessary.

The tints obtained by the new process vary from reddish-brown to violet-brown and are also sometimes blackish, according to the dyestuffs used. The monoazo body obtained from a diazotized 1:5-, 2:8- or 2:5- aminonaphtholsulfonic acid yields pronounced brown tints of a reddish to violet hue, while the dyestuffs obtained from a 1:8- amino-naphtholsulfonic acid yields blackish-brown tints.

A brown tint of a deep violet hue and capable of being discharged can be obtained by proceeding as indicated in the following example: 10 grams of the azo-dyestuff, produced by combining diazotized 2:5:7- amino-naphtholsulfonic acid with meta-phenylenediamin, are dissolved in the form of its sodium salt in water, and the solution is diluted to make one liter. The cotton fabric is padded with this solution, then dried and passed through a bath prepared in the usual manner by diazotizing 14 grams of paranitranilin, adding 40 grams of crystallized sodium acetate and diluting the mixture to 1 liter. The fabric is then washed, soaped and dried. Thus a deep dark-brown tint of great fastness to soap and capable of being readily discharged, is obtained.

In a quite analogous manner dyeings can be produced by using other chrysoidins obtained by combining a diazotized aminonaphtholsulfonic acid with meta-phenylenediamin or a derivative thereof.

The structural formula of the dyestuff formed on the cotton-fiber by the treatment with nitrodiazobenzene, is as follows:

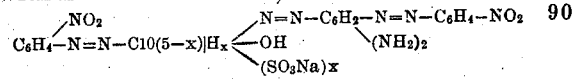

Having now described our invention, what we claim is:

The herein described process of producing dyeings on cotton, fast to washing and capable of being discharged, by applying on the fabric dyestuffs, obtained by combining a diazotized aminonaphtholsulfonic acid with a metadiamin, and then treating the dyestuffs on the fiber with nitrodiazobenzene.

In testimony whereof, we affix our signatures in presence of two witnesses.

OTTO ERNST.
HEINRICH EICHWEDE.

Witnesses:
JEAN GRUND,
CARL GRUND.

Correction in Letters Patent No. 1,012,619.

It is hereby certified that in Letters Patent No. 1,012,619, granted December 26, 1911, upon the application of Otto Ernst and Heinrich Eichwede, of Höchst-on-the-Main, Germany, for an improvement in "Processes of Producing Dischargeable Dyeings on Cotton," an error appears in the printed specification requiring correction as follows: In formula, line 91, for "$N - C10(5-x) | H_x$" read $N - C_{10}H_{(5-x)}$; and that the said Letters Patent should be read with this correction therein that the same may conform to the record of the case in the Patent Office.

Signed and sealed this 11th day of June, A. D., 1912.

[SEAL.]

C. C. BILLINGS,
*Acting Commissioner of Patents.*